United States Patent
Marty et al.

(10) Patent No.: US 7,731,923 B2
(45) Date of Patent: Jun. 8, 2010

(54) METHOD FOR SIMULTANEOUSLY PRODUCING HYDROGEN AND CARBON MONOXIDE

(75) Inventors: Pascal Marty, Paris (FR); Arthur Darde, Paris (FR); Antoine Hernandez, Le Plessis-Trevise (FR); Jean-Marc Tsevery, Lieusaint (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 30 days.

(21) Appl. No.: 11/916,688

(22) PCT Filed: May 22, 2006

(86) PCT No.: PCT/FR2006/050468

§ 371 (c)(1),
(2), (4) Date: Jul. 8, 2008

(87) PCT Pub. No.: WO2007/000545

PCT Pub. Date: Jan. 4, 2007

(65) Prior Publication Data

US 2008/0308769 A1    Dec. 18, 2008

(30) Foreign Application Priority Data

Jun. 6, 2005   (FR)  .................................. 05 50421

(51) Int. Cl.
*B01J 8/00*   (2006.01)
*C01B 3/02*   (2006.01)

(52) U.S. Cl. .............. 423/210; 423/220; 423/418.2; 423/648.1; 423/651; 422/129; 422/187; 422/188; 252/373

(58) Field of Classification Search ................. 423/210, 423/220, 418.2, 648.1, 650, 651; 422/129, 422/187, 188; 252/373

See application file for complete search history.

(56) References Cited

U.S. PATENT DOCUMENTS

| 7,380,413 B2 | 6/2008 | Dumont et al. |
| 2004/0052725 A1* | 3/2004 | Niu et al. ............ 423/651 |

(Continued)

FOREIGN PATENT DOCUMENTS

EP    0 307 843    3/1989

(Continued)

OTHER PUBLICATIONS

International Search Report for PCT/FR2006/050468, dated Feb. 1, 2007.

*Primary Examiner*—Timothy C Vanoy
(74) *Attorney, Agent, or Firm*—Elwood L. Haynes (57) ABSTRACT

The invention relates to a method for simultaneously producing hydrogen and carbon monoxide consisting in generating a synthesis gas and in processing it by decarbonising and removing water and remaining carbon dioxide by passing said gas through a bed of adsorbents, in separating remaining components by forming at least one $H_2$ rich flow, a CO flow containing at least one type of impurity selected from nitrogen and argon, a methane-rich purge gas flow and a flash gas flow. The inventive method also consists in regenerating the bed of adsorbents by passing a regeneration gas comprising at least one non-zero proportion of the formed $H_2$ flow and in recycling at least the purge and flash gases for feeding the synthesis gas generation stage.

16 Claims, 4 Drawing Sheets

U.S. PATENT DOCUMENTS

2005/0034372 A1 2/2005 Engler et al.
2005/0066813 A1 3/2005 Dunn

FOREIGN PATENT DOCUMENTS

| | | |
|---|---|---|
| EP | 0 359 629 | 3/1990 |
| EP | 0 790 212 | 8/1997 |
| WO | WO 03 043718 | 5/2003 |
| WO | WO 03 086965 | 10/2003 |

* cited by examiner

METHOD FOR SIMULTANEOUSLY PRODUCING HYDROGEN AND CARBON MONOXIDE

This application is a 371 of International PCT Application PCT/FR2006/050468, filed May 22, 2006.

BACKGROUND

The present invention relates to a process for the simultaneous production of hydrogen and carbon monoxide and to an installation for implementing this process.

Processes for the production of carbon monoxide and hydrogen may be divided into two parts:

generation of the syngas (a mixture essentially containing $H_2$, $CO$, $CH_4$, $CO_2$ and $N_2$). Among the various industrial syngas production processes may be mentioned steam reforming, partial oxidation, autothermal reforming, etc., of which steam reforming may be considered to be the most important process. Depending on the composition of the mixture to be reformed, steam reforming is frequently preceded by pretreatment steps, especially a hydrodesulfurization step, and by a prereforming step. In the rest of the description, otherwise indicated, the expression "syngas generation" will cover all the steps resulting in the generation of a syngas, the expression "feed the syngas generation unit" (with a fluid) or "send (a fluid) to the feed for the syngas generation unit" will mean that a fluid, some or all of the constituents of which will be in the syngas, is delivered to said unit. Among fluids feeding the generation unit, mention may in particular be made of the hydrocarbon feedstock, hydrogen for feeding the desulfurization step, oxidizing fluids for the prereforming and reforming steps, including water vapor and carbon dioxide; and purification of the syngas. The main steps thereof are:

primary decarbonation, intended to remove most of the $CO_2$ contained in the syngas coming from the generation step, said decarbonation in general being obtained by scrubbing the syngas with amines;

desiccation/secondary decarbonation, often also called stripping, during which the gas is stripped of its water and of the residual carbon dioxide. This step is carried out by passing the gas over an adsorbent bed. The stripping unit generally comprises two adsorption bottles operating alternately, one being in adsorption phase while the other is in countercurrent desorption or regeneration phase. The regeneration gas used during this regeneration phase must be dry and free of carbon dioxide, separation, consisting in general of a low-temperature treatment by a cryogenic process (in a cold box) for producing carbon monoxide and hydrogen (and optionally a mixture of the two) at flow rates and purities required by the consumer. During the separation step, tail gases are produced. They contain the elements that are undesirable in the products delivered to the consumer, but also a nonzero amount of hydrogen and carbon monoxide which are entrained in these tail gases. This impairs the efficiency of the separation unit.

Usually the separation is carried out by scrubbing with liquid methane, which makes it possible to obtain pure carbon monoxide with a recovery yield possibly up to 99%, hydrogen, the carbon monoxide content of which generally varies a few ppm and 1%, and a methane-rich waste gas used as fuel.

Another solution consists in partially condensing the flow of syngas in order to produce pure carbon monoxide and pure hydrogen, together with a flash gas and a low-pressure waste gas essentially composed of $CO$ and $CH_4$, also called a methane purge gas. When the nitrogen content of the hydrocarbon feedstock is too high, it is necessary to add a cryogenic step for denitrogenating the $CO$ produced.

Processes of this type are described in EP-A-0 359 629.

To reduce both the operating and investment costs of carbon monoxide and/or hydrogen production units is a constant preoccupation, as is improving the production yields and quality.

Thus, EP-A-0 790 212 describes a process in which a fraction enriched with residual methane is recycled to the feed fluid so as to reduce the specific consumption of hydrocarbons per mold of $CO$ produced.

Moreover, regeneration of the stripping unit uses a gas that must be dry and free of carbon dioxide.

In many cases, the hydrogen produced by the cold box (containing up to 1 mol % of $CO$) is used as stripping regeneration gas, and then sent to an adsorbent-based (PSA) purification unit before being taken to the final consumer.

However, if the cold box is designed for the direct production of hydrogen meeting the consumer's purity specifications, it is no longer possible to use this gas as regeneration gas, except for drawing off a portion of the production and reducing the hydrogen yield of the installation.

Also in the case in which a carbon monoxide-hydrogen mixture generally containing 50% hydrogen is produced, since the amount of hydrogen remaining as waste gas is too low to regenerate the stripping unit, it is therefore necessary to find another gas as regeneration gas.

A known solution therefore consists in producing an additional amount of hydrogen, which will then be used as stripping regeneration gas and finally utilized as fuel.

EP-A-1 503 953 describes a process in which a hydrogen-rich gas is recycled into the syngas upstream of the decarbonation unit, after said gas has been used as regeneration gas in the stripping unit.

Moreover, as mentioned above, it may be necessary, to meet the purity specifications required by the consumer, to strip the carbon monoxide product output by the cold box of some of the impurities present. This is because, at the outlet of the cold box, the carbon monoxide will also contain the nitrogen and argon that are present in the syngas as its components, which have physicochemical characteristics very close to those of $CO$, which cannot be separated from the latter by the separation means used for the other components of the syngas. These gaseous impurities generally behave as inert gases, but their presence, or even their accumulation, is in the best case problematic, as it requires the apparatus to be oversized, it increases the energy consumption, etc.

Thus, it is often necessary to reduce the nitrogen content in the carbon monoxide product output by the cold box, in particular when the carbon monoxide is used as starting product for certain syntheses, including the synthesis of acetic acid, but also when the starting hydrocarbon is rich in nitrogen. Similarly, it may be necessary to reduce the argon content, coming in particular from the oxygen in the case of a partial oxidization step or an autothermal reforming step.

A known solution for removing the nitrogen therefore consists in equipping the separation unit (cold box) with a denitrogenation column (or one for removing the argon) intended to eliminate some of the nitrogen (or argon) contained in the carbon monoxide produced by the separation unit, so that the nitrogen (argon) content is compatible with the consumer specifications; however, this solution is very expensive in terms of operating and investment costs.

The process according to the invention makes it possible to reduce the nitrogen content and the argon content in the carbon monoxide product output by the separation unit. The requirement to denitrogenate the CO product will thus be less, or the denitrogenation step may even be omitted. The same applies to the argon.

Another advantage of the process according to the invention is that it allows the use of hydrogen produced during the separation as regeneration gas for the drying step, without reducing the hydrogen yield, and to do so even in the absence of a subsequent hydrogen purification step (especially by pressure swing adsorption or PSA).

Another advantage of the invention lies in the optimized use of the various compressors available on the production installation, thus making it possible to minimize their number, to improve the reliability of the installation, and to minimize the costs.

According to one subject of the invention, what is therefore proposed is a process for the simultaneous production of hydrogen and carbon monoxide from the hydrocarbon feedstock, said process comprising the steps of:

a) generating a syngas, such as a hydrocarbon reforming gas, containing mainly hydrogen and carbon monoxide, but also methane, carbon dioxide, water and at least one impurity selected from nitrogen and argon;

b) decarbonizing the syngas coming from step a) in a primary decarbonation unit, forming a carbon dioxide stream and a stream containing the syngas with a reduced carbon dioxide content;

c) eliminating the water and the remaining carbon dioxide that are contained in the syngas coming from step b) by passing said gas over an adsorbent bed;

d) separating the remaining constituents, forming at least:
  i) a hydrogen product gas stream,
  ii) a carbon monoxide product gas stream, which further includes at least one impurity selected from nitrogen and argon,
  iii) a methane-rich purge gas stream and
  iv) a flash gas stream containing hydrogen, CO and methane, characterized in that the process further includes the following steps of:

e) regenerating the adsorbent bed of step c) by passage of a regeneration gas comprising at least a nonzero proportion of the hydrogen-rich stream i); and f) recycling streams iii) and iv) coming from step d) in order to feed step a).

According to other optional aspects, the invention may relate to:

a process in which all or part of stream i) is used as regeneration gas, and then all of the stream is purified in a PSA purification unit in order to produce a pure hydrogen stream, for consumer requirements, and a PSA tail gas;

a process in which the PSA tail gas is added to the gas streams iii) and iv) to be recycled for feeding step a);

a process in which the stream i) is separated into at least two fractions, the first constituting the consumer product and the second being used for carrying out step e), characterized furthermore in that said second fraction is then recycled for feeding step a);

a process characterized in that all or part of the carbon dioxide produced in step b) is also recycled to the feed for step a);

a process characterized in that step a) is furthermore fed with imported carbon dioxide;

a process for the production of a carbon monoxide stream having a low nitrogen content, characterized in that step d) does not include a denitrogenating step;

a process for the production of a stream of carbon monoxide having a nitrogen content of less than 1.1% from a hydrocarbon feedstock consisting of a natural gas having a nitrogen content of between 1 and 1.5%; and a process that furthermore includes one or more steps of converting the carbon monoxide into acetic acid or into polycarbonates.

According to another subject of the invention, what is provided is an installation for the simultaneous production of hydrogen and carbon monoxide, said installation comprising:

a hydrocarbon source;
a syngas generation unit;
a syngas primary decarbonation unit;
a desiccation/secondary decarbonation unit; and
a separation unit, for separation into at least a gaseous hydrogen product stream, a gaseous carbon monoxide product stream, a purge gas stream and a flash gas stream;

together with:

lines connecting the hydrocarbon source and the syngas generation unit, connecting the syngas generation unit to the primary decarbonation unit, connecting the primary decarbonation unit to the desiccation unit and connecting the desiccation unit to the separation unit; and means for withdrawing hydrogen and carbon monoxide as products, characterized in that it includes lines for sending a nonzero proportion of the gaseous hydrogen product stream i) to the desiccation/secondary decarbonation unit and lines for sending the purge gas stream iii) and the flash gas iv) stream to the feed for the syngas generation unit.

The installation may be adapted or constructed for implementing any one of the processes as defined above.

In the case in which the syngas generation unit is fed from a source of natural gas or of light hydrocarbons and comprises at least a hydrodesulfurization unit, a prereforming unit and a steam reforming unit, said installation includes lines for sending a nonzero portion of at least one of the streams coming from the separation unit, with the exception of the carbon monoxide stream, for feeding the desulfurization unit and/or the prereforming unit and/or the reforming unit.

The installation may thus comprise all or some of the following means:

at least a compression means for compressing at least a portion of the carbon-dioxide-enriched gas coming from the decarbonation unit and/or imported carbon dioxide for feeding the syngas generation unit and at least a line for sending all or some of the recycled streams to the inlet of said compression means in order to compress at least a portion of the carbon-dioxide-enriched gas coming from the decarbonation unit and/or the imported carbon dioxide so as to feed the syngas generation unit;

at least a compression means for compressing the hydrogen feeding the desulfurization unit of the syngas generation unit and at least a line for sending all or some of the recycled streams to the inlet of said compression means in order to compress the hydrogen feeding the hydrodesulfurization unit of the syngas generation unit; and at least a compression means for compressing the gaseous hydrocarbon feeding the syngas generation unit and at least a line for sending all or some of the recycled streams to the inlet of the compression means in order to compress the gaseous hydrocarbon feeding the syngas generation unit.

The installation may also include at least a compression means for compressing the hydrogen product, produced by the separation unit or the purification unit, a means for withdrawing a fraction of the hydrogen product stream after compression, and at least a line for sending said fraction to the syngas generation unit.

The invention will now be described with reference to the following figures, which illustrate methods of implementing the process of the invention.

FIG. 1 illustrates one method of implementing the invention in which the hydrogen produced in the cold box is then purified in a PSA unit. The recycled streams are compressed by the $CO_2$ compressor before being fed to the syngas generation unit.

FIGS. 2 to 4 show alternative forms of the invention in which the hydrogen produced by the cold box has a purity suitable for the requirements of the consumer. A nonzero fraction of the hydrogen produced is taken off and used as regeneration gas before being recycled with the purge and flash gases.

According to the method of implementation shown in FIG. 2, the gases are recycled via the $CO_2$ compressor.

According to the method of implementation shown in FIG. 3, the gases are recycled to the hydrodesulfurization (HDS) unit via the dedicated hydrogen compressor.

According to the method of implementation shown in FIG. 4, the gases are recycled into the hydrocarbon feedstock that feeds the syngas generation unit.

It should be understood that the invention is not limited to these methods of implementation. A person skilled in the art will be able in particular to envision alternative versions of the generation, treatment and recycling techniques illustrated in these methods of implementation.

Figure 1:
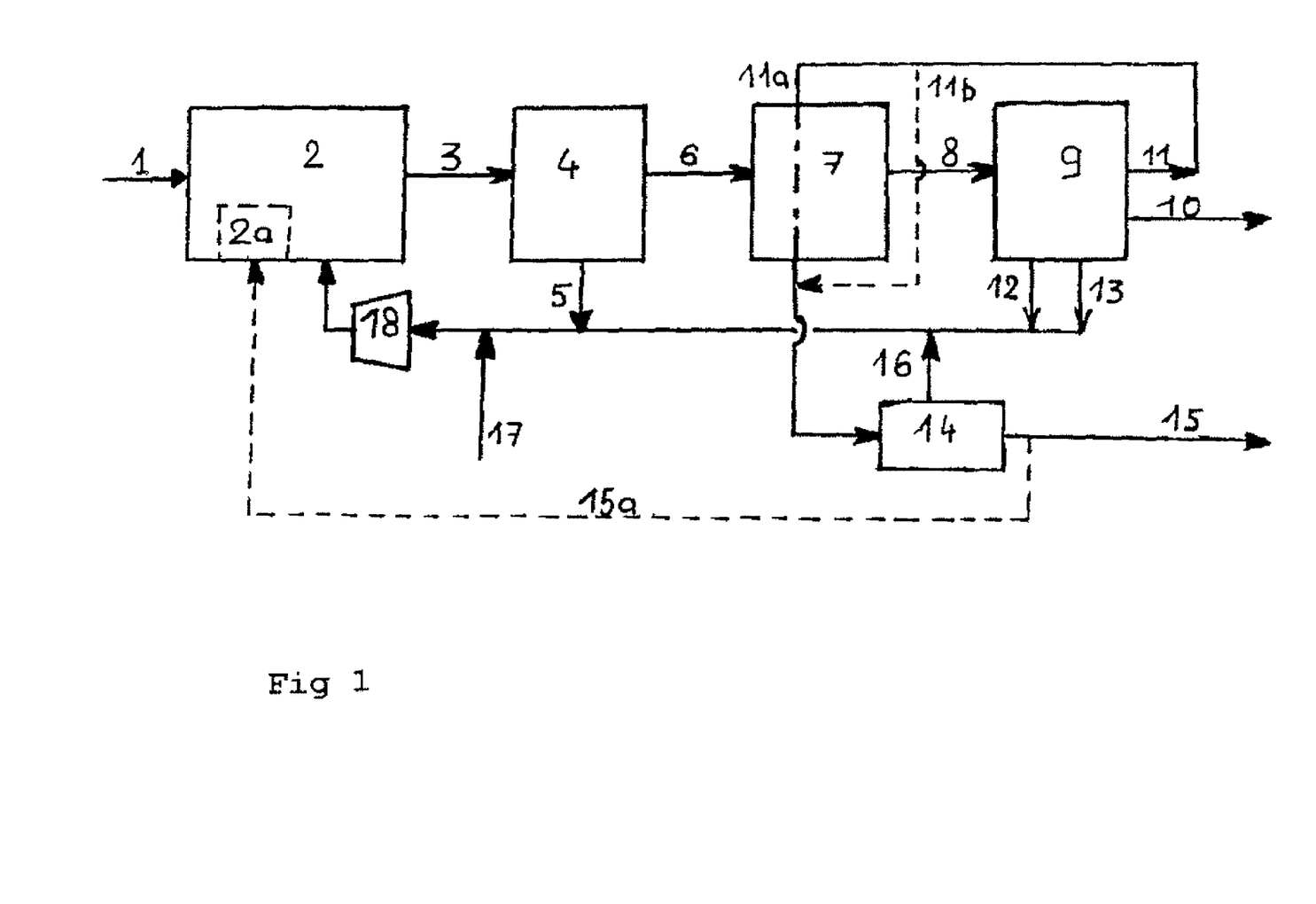
FIGS. 1 to 4 show schematically an installation for generating and separating the syngas, with recycling of gas streams according to the invention.

In FIG. 1, a stream 1 of hydrocarbons (for example natural gas) feeds a syngas generation unit 2 and the syngas stream 3 generated in the unit 2 passes into an amine scrubbing unit 4 so as to remove the carbon dioxide, which is recovered via the gas stream 5. The decarbonated syngas 6 is then stripped of its water and residual $CO_2$ in a stripping unit 7 in order to produce a gas stream 8 containing hydrogen, carbon monoxide and methane, together with the nitrogen and the argon that are initially present in the natural gas, or in any other fluid (not shown) feeding the unit 2.

This gas stream is then separated in a cryogenic separation unit 9 in order to produce a carbon-monoxide-rich (typically 99%) gaseous product 10, a hydrogen-rich gas 11, a methane purge 12 and a flash gas 13.

The gas 11 having an insufficient purity for the requirements of the consumer, has to undergo a purification step. Prior to this step, the gas 11 is divided into its fraction 11a as regeneration gas for the unit 7, where it is used to regenerate one of the adsorbent beds, and into its by-passed fraction 11b. The fraction 11a is essentially laden with water, but also with $CO_2$. The two fractions are then combined and the resulting stream is sent into the PSA (pressure swing adsorption) unit 14 in order to deliver a purified hydrogen stream 15 (typically with a purity of 99% or higher) and a PSA tail gas 16.

A $CO_2$ stream 17 is imported into the installation and compressed in the compressor 18 before feeding the syngas generation unit 2.

The methane purge 12, the flash gas 3, the PSA tail gas 16 and the $CO_2$ 5 coming from the decarbonation unit are recycled toward the unit 2 and are sent, with the stream 17, so as to feed the compressor 18, in order to be compressed therein before being fed into the syngas generation unit 2.

As a variant or in addition, when the syngas generation involves a hydrodesulfurization step prior to a reforming (possibly prereforming) step, a fraction (the dotted line referenced 15a in the figure) of the hydrogen stream 15 may be sent into the hydrodesulfurization unit (dotted lines referenced 2a in the unit 2).

Figure 2:
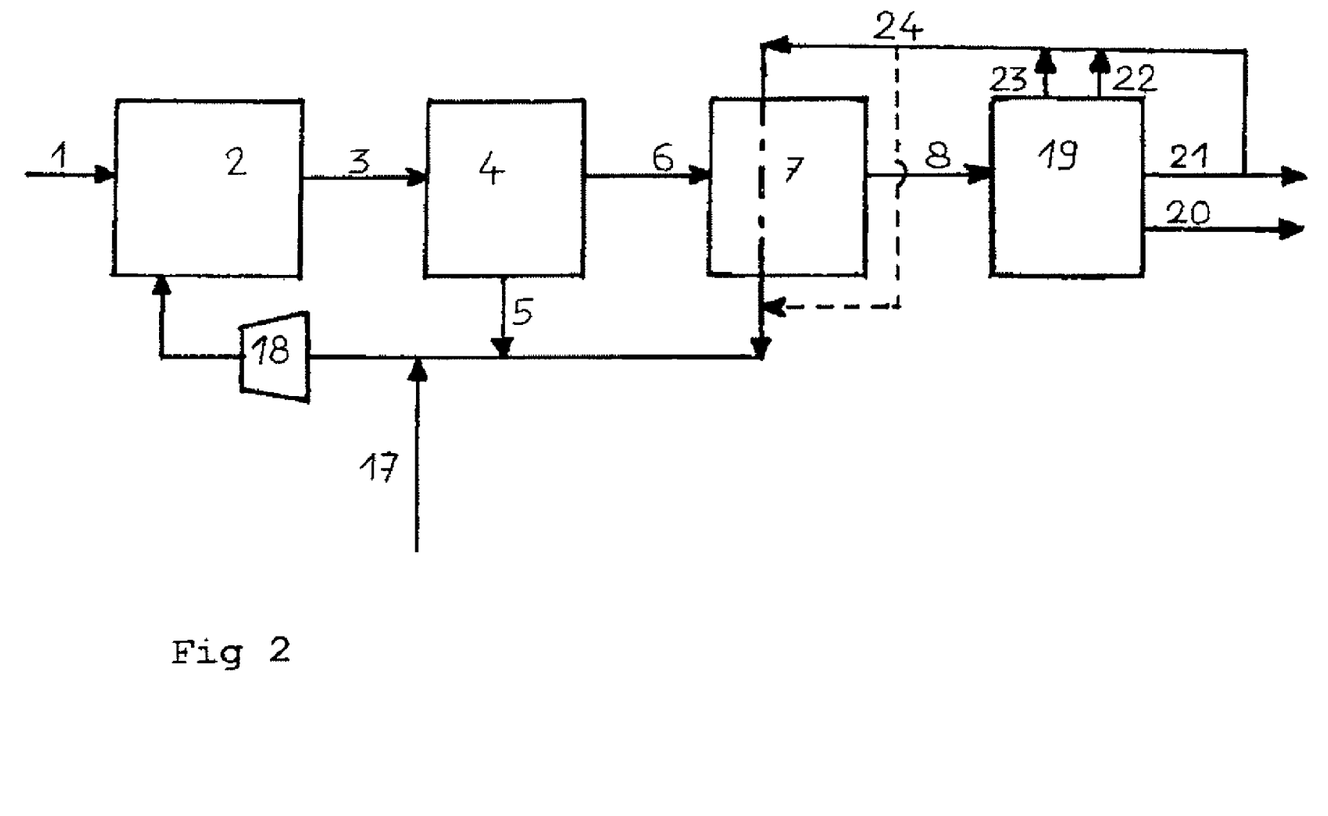

In FIG. 2, the streams and constituent elements of the installation having the same reference numerals as those in FIG. 1 correspond to the streams and constituent elements denoted in FIG. 1. Thus, the hydrocarbon stream 1 feeds the syngas generation unit 2, and the syngas stream 3 generated in the unit 2 passes into the amine scrubbing unit 4 so as to remove the carbon dioxide, which is recovered via the gas stream 5. The decarbonated syngas 6 is then stripped of its water and of residual $CO_2$ in the stripping unit 7, in order to produce a gas stream 8 containing hydrogen, carbon monoxide and methane, together with the nitrogen and argon that are initially present in the hydrocarbons or any other fluid (not shown) feeding the unit 2.

The gas stream 8 is then separated in a cryogenic separation unit 19 in order to produce a carbon-monoxide-rich (typically 99%) gaseous product 20, a hydrogen-rich gas 21, a methane purge 22 and a flash gas 23.

In this example, the gas 21 has a hydrogen purity sufficient for the requirements of the consumer, without it being necessary to add an additional purification step. A portion of this hydrogen is withdrawn in order to form, with the methane purge 22 and the flash gas 23, a gas stream 24 which will be sent as regeneration gas to the unit 7 (with a by-pass by the dotted line).

A $CO_2$ stream 17 is imported into the installation and compressed in the compressor 18 before feeding the syngas generation unit 2.

After regeneration, the gas 24 and the $CO_2$ stream 5 coming from the decarbonation unit 4 are combined and recycled toward the unit 2 and sent, with the stream 17, to the feed of the compressor 18 in order to be compressed before feeding the syngas generation unit 2.

Figure 3:
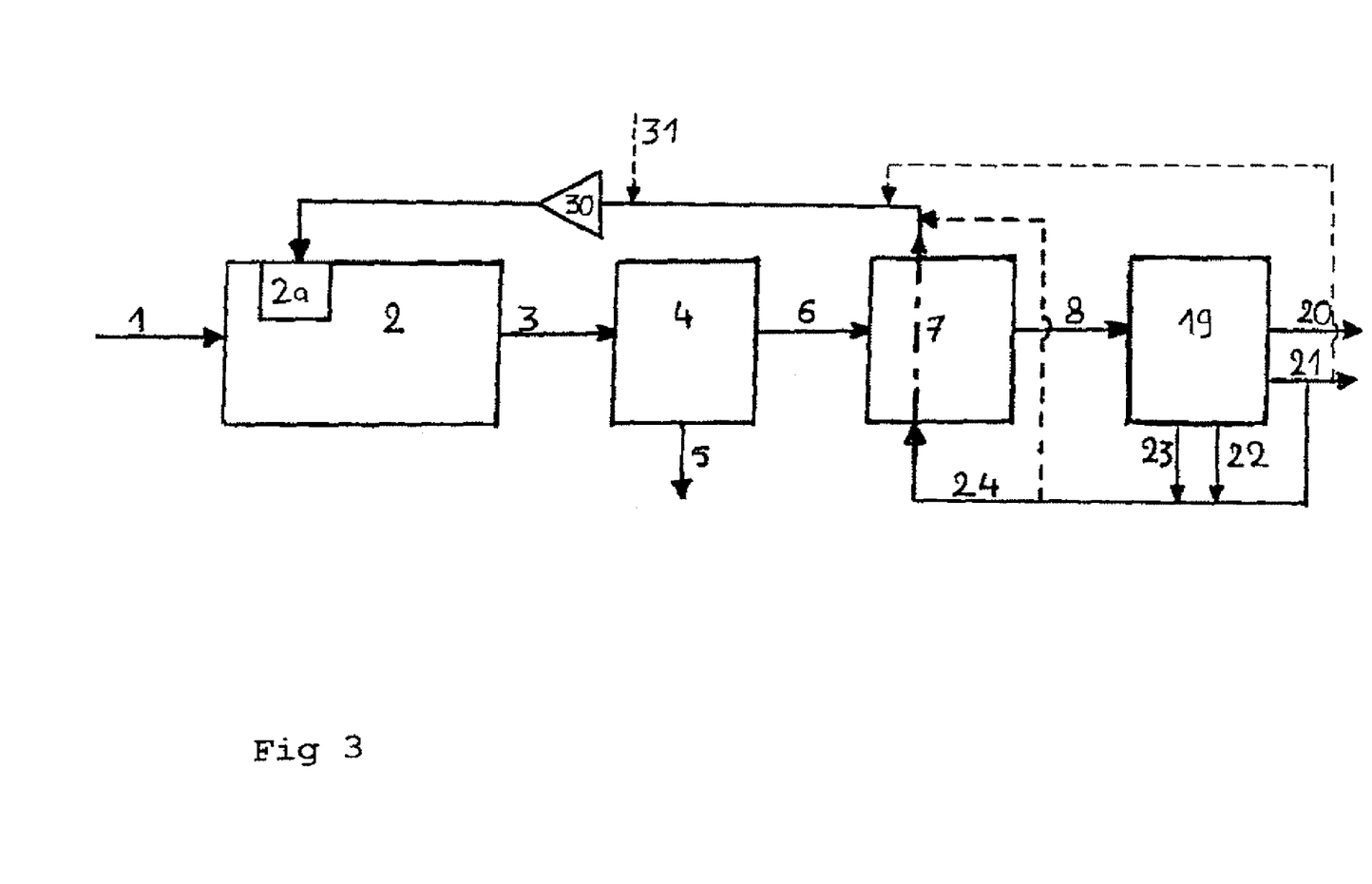

In FIG. 3, the streams and constituent elements of the installation having the same reference numerals as those of FIG. 1 or FIG. 2 correspond to the stream and constituent elements denoted in these figures.

As in the case of FIG. 2, the gas 21 has a hydrogen purity sufficient to be sold directly to the consumer without a subsequent purification step. One portion of this hydrogen is withdrawn to form, with the methane purge 22 and the flash gas 23, a gas stream 24 that will be sent as regeneration gas to the unit 7 (a by-pass is shown by the dotted lines).

In FIG. 3, after regeneration, the gas 24 is recycled into the unit 2 where the generation of the syngas takes place with a prior hydrodesulfurization step—it is chosen to send the gas 24 used for the regeneration (together with the by-pass) to the feed of a hydrogen compressor 30 for compressing the hydrogen feeding the HDS module of the unit 2.

This hydrogen may come from various sources. Thus, as a variant or in addition, a second fraction (the dotted line, not referenced in the figure) of the hydrogen product stream 21 may be sent via the compressor 30 into the hydrodesulfurization unit. According to another variant (not shown), some hydrogen may be withdrawn in the stream 21 after it has been compressed in a compressor dedicated to compressing the hydrogen product. In this case, if the hydrogen pressure is sufficient, it may feed the HDS unit without additional compression. A hydrogen stream 31 is optionally imported into the installation and is compressed (according to the requirements) in the compressor 30 before feeding the syngas generation unit 2.

By judiciously using or adapting the various compression options of the installation, the compression costs should thus be minimized.

Figure 4:
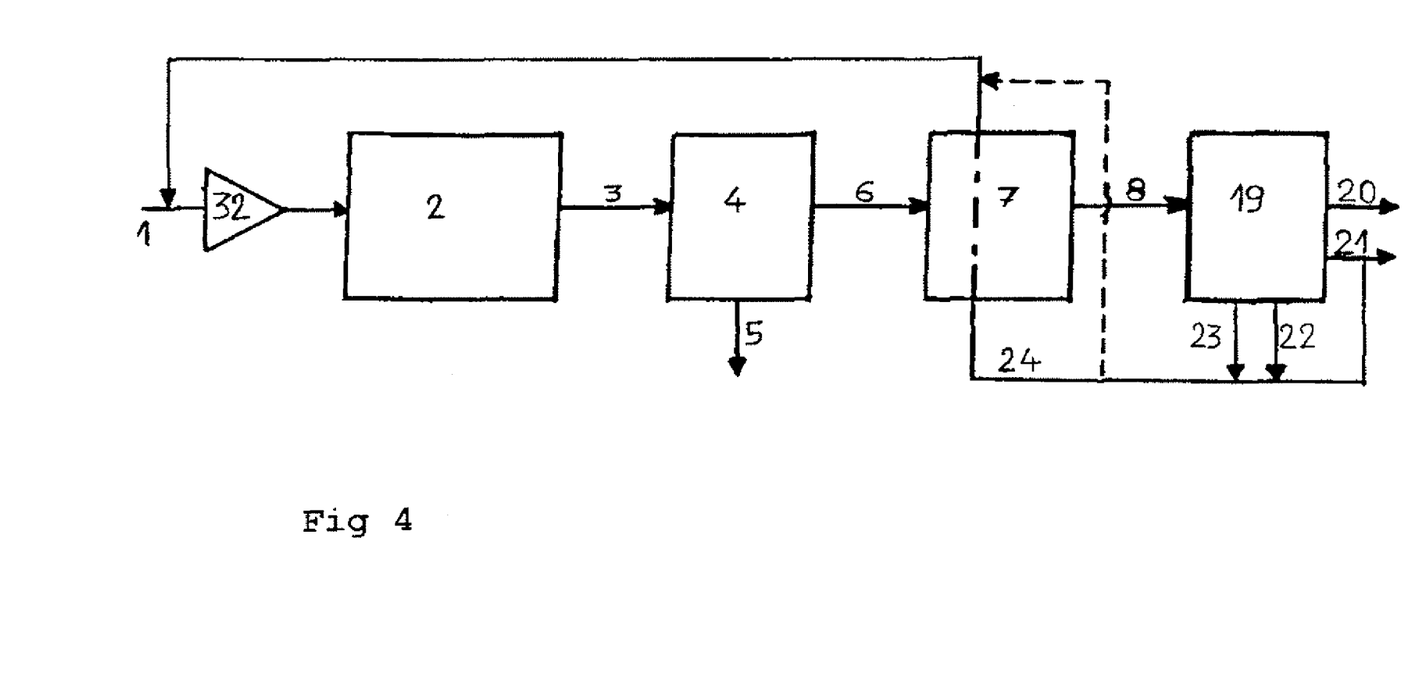

In FIG. 4, the streams and constituent elements of the installation having the same reference numerals as those of FIG. 1, FIG. 2 or FIG. 3 correspond to the streams and constituent elements denoted in these figures.

As in FIGS. 2 and 3, the stream 21 has a sufficient hydrogen purity to be sold directly to the consumer without subsequent purification. A portion of this hydrogen is withdrawn to form, with the methane purge 22 and the flash gas 23, a gas stream 24 which is sent as regeneration gas to the unit 7 (with a by-pass shown by the dotted lines).

In FIG. 4, after regeneration, the gas 24 is recycled into the unit 2 as a complement to the hydrocarbon feedstock 1 and upstream of an existing feedstock compressor 32.

As a variant, when the feedstock 1 is available at a sufficient pressure without it being necessary to use a feedstock compressor, it will be necessary, in order to use the stream 21 as complementary feedstock, to use a dedicated compressor or to withdraw the hydrogen in the stream 21 after a product compressor.

Thus, as illustrated in the previous examples, it is possible to use the streams produced by the cryogenic separation unit to feed the syngas generation step in various ways. They may be used as feedstock, as partial substitution for the hydrocarbon feedstock, as hydrogen, as partial substitution of the desulfurization hydrogen, and/or as $CO_2$.

Irrespective of the use to which the process according to the invention is put, these recycled streams contribute to feeding the syngas generation unit. Since they are free of nitrogen, helium and other inert gases, they modify the composition of the syngas generated, while reducing its content of these constituents.

The advantages of the process according to the invention are numerous—in particular, mention may thus be made of:
  being able to minimize the content of inert gas (nitrogen or argon in particular) in the carbon monoxide product. This point is always beneficial, but it will be particularly so when the inert gas content in the feed gas is such that, without recycling the coproduct gas streams at the same time as the CO, it is necessary, in order to meet the consumer's specifications, to invest an additional step for separating one or more inert gases from the CO;
  increasing the CO production, while recycling all the carbon-containing molecules other than the CO produced into the feed for the generation step;
  increasing the $H_2$ and CO production yields;
  deballasting the fuel balance of the syngas generation unit (by increasing the portion of natural gas as fuel instead of the off gas and waste gas that are generally recycled in order to be burnt as combustible gas);
  reducing the calorific power sent to the burners;
  reducing the flame temperature in the burners;
  being able to use the hydrogen product during the separation as regeneration gas for the drying step, without reducing the hydrogen yield, and to do so without a subsequent step for purifying the hydrogen product;
  minimizing the size of the equipment for generating the syngas; and
  adjusting the $H_2/CO$ ratio of the gases produced as output from the reactor.

Other advantages of the invention result from the optimized use of the various compressors existing on the plant, together with the fact that a common compressor will be used to compress several fluids. This enables the reliability of the installation to be improved, while minimizing its costs. Among these advantages, the following should thus be noted:
  the number of machines is minimized;
  a centrifugal compressor can be used instead of one or more reciprocating or piston compressors;
  the number of lines is reduced; and
  the number of compressed-gas inlet points in the units is limited.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the simultaneous production of hydrogen and carbon monoxide from the hydrocarbon feedstock, said process comprising the steps of:
  a) generating a syngas
  b) decarbonizing the syngas coming from step a) in a primary decarbonation unit, forming a carbon dioxide stream and a stream containing the syngas with a reduced carbon dioxide content;
  c) eliminating the water and the remaining carbon dioxide that are contained in the syngas coming from step b) by passing said gas over an adsorbent bed;
  d) separating the remaining constituents, forming at least:
    i) a hydrogen product gas stream;
    ii) a carbon monoxide product gas stream, which further includes at least one impurity selected from nitrogen and argon;
    iii) a methane-rich purge gas stream; and
    iv) a flash gas stream containing hydrogen, CO, and methane;
wherein the process further includes the following steps of:
  e) regenerating the adsorbent bed of step c) by passage of a regeneration gas comprising at least a nonzero proportion of the hydrogen-rich stream i); and
  f) recycling streams iii) and iv) coming from step d) in order to feed step a).

2. The process of claim 1, in which all or part of stream i) is used as regeneration gas, and then all of the stream is purified in a PSA purification unit in order to produce a pure hydrogen stream, for consumer requirements, and a PSA tail gas.

3. The process of claim 2, in which the PSA tail gas is added to the gas streams iii) and iv) to be recycled for feeding step a).

4. The process of claim 1, in which the stream i) is separated into at least two fractions, the first constituting the consumer product and the second being used for carrying out step e), characterized furthermore in that said second fraction is then recycled for feeding step a).

5. The process of claim 1, wherein all or part of the carbon dioxide produced in step b) is also recycled to the feed for step a).

6. The process of claim 1, wherein step a) is furthermore fed with imported carbon dioxide.

7. The process of claim 1 for the production of carbon monoxide having a low nitrogen content, wherein step d) does not include a denitrogenating step.

8. The process of claim 7 for the production of carbon monoxide having a nitrogen content of less than 1.1%, wherein the hydrocarbon feedstock consists of a natural gas having a nitrogen content of between 1 and 1.5%.

9. The process of claim 1, which further includes one or more steps of converting the carbon monoxide into acetic acid or into polycarbonates.

10. The process of claim 1, wherein said syngas comprises a hydrocarbon reforming gas.

11. The process of claim 1, wherein said syngas comprises hydrogen, carbon monoxide, methane, carbon dioxide, water and at least one impurity selected from the group consisting of nitrogen and argon.

12. An installation for the simultaneous production of hydrogen and carbon monoxide, said installation comprising:
   a) a hydrocarbon source;
   b) a syngas generation unit;
   c) a syngas primary decarbonation unit;
   d) a desiccation/secondary decarbonation unit; and
   e) a separation unit, for separation into at least a gaseous hydrogen product stream, a gaseous carbon monoxide product stream, a purge gas stream and a flash gas stream;
together with:
   f) lines connecting the hydrocarbon source and the syngas generation unit, connecting the syngas generation unit to the primary decarbonation unit, connecting the primary decarbonation unit to the desiccation unit and connecting the desiccation unit to the separation unit; and
   g) means for withdrawing hydrogen and carbon monoxide as products, wherein it includes lines for sending a nonzero proportion of the gaseous hydrogen product stream to the desiccation/secondary decarbonation unit and lines for sending the purge gas stream and the flash gas stream to the feed for the syngas generation unit.

13. The installation of claim 12, in which the syngas generation unit is fed from a source of natural gas or of light hydrocarbons and comprises at least a desulfurization unit, a prereforming unit and a steam reforming unit, wherein said installation includes lines for sending a nonzero portion of at least one of the streams coming from the separation unit, with the exception of the carbon monoxide stream, to the desulfurization unit and/or to the prereforming unit and/or to the reforming unit.

14. The installation of claim 12, which further includes at least a compression means for compressing at least a portion of the carbon-dioxide-enriched gas coming from the decarbonation unit and/or imported carbon dioxide for feeding the syngas generation unit and at least a line for sending all or some of the recycled streams to the inlet of said compression means in order to compress at least a portion of the carbon-dioxide-enriched gas coming from the decarbonation unit and/or the imported carbon dioxide so as to feed the syngas generation unit.

15. The installation of claim 12, which further includes at least a compression means for compressing the hydrogen feeding the desulfurization unit of the syngas generation unit and at least a line for sending all or some of the recycled streams to the inlet of said compression means in order to compress the hydrogen feeding the desulfurization unit of the syngas generation unit.

16. The installation of claim 12, which further includes at least a compression means for compressing the gaseous hydrocarbon feeding the syngas generation unit and at least a line for sending all or some of the recycled streams to the inlet of the compression means in order to compress the gaseous hydrocarbon feeding the syngas generation unit.

* * * * *